(12) United States Patent
Mola

(10) Patent No.: US 11,915,028 B2
(45) Date of Patent: Feb. 27, 2024

(54) VIRTUAL MACHINE EXECUTION TRACING

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/155,892

(22) Filed: Jan. 22, 2021

(65) Prior Publication Data
US 2021/0141659 A1    May 13, 2021

Related U.S. Application Data

(62) Division of application No. 16/374,172, filed on Apr. 3, 2019, now Pat. No. 10,963,288, which is a division
(Continued)

(51) Int. Cl.
G06F 9/455    (2018.01)
G06F 11/36    (2006.01)

(52) U.S. Cl.
CPC ...... *G06F 9/45558* (2013.01); *G06F 11/3636* (2013.01); *G06F 2009/45591* (2013.01)

(58) Field of Classification Search
CPC ............ G06F 9/45558; G06F 11/3636; G06F 2009/45591; G06F 2009/45575
See application file for complete search history.

(56) References Cited

U.S. PATENT DOCUMENTS 5,894,575 A    4/1999 Levine et al.
7,506,318 B1   3/2009 Lindo et al.
(Continued)

FOREIGN PATENT DOCUMENTS

CN    1722086 A    1/2006
CN    1732433 A    2/2006
(Continued)

OTHER PUBLICATIONS

"BugNet: Continuously Recording Program Execution for Deterministic Replay Debugging," In proceedings of the International Symposium on Computer Architecture, Jun. 4, 2005, Narayanasamy et al. (Year: 2005).*
(Continued)

*Primary Examiner* — Sisley N Kim
(74) *Attorney, Agent, or Firm* — WORKMAN NYDEGGER

(57) ABSTRACT

Embodiments relate to a virtualization layer capturing replayable execution traces of VMs managed by the virtualization layer. Execution tracing can be performed on any unit of execution managed by the virtualization layer, e.g., threads, processes, virtual processors, individual VMs, multiple VMs, etc. Traced execution units may be executing in parallel. Execution tracing involves capturing to a buffer: executed instructions, memory inputted to instructions, memory outputted by instructions, registers touched by instructions, and ordering markers. Trace data can be captured in chunks, where causality is preserved and ordering is preserved between chunks but not necessarily within chunks. The chunks may be delineated by inserting monotonically increasing markers between context switches, thus relatively ordering the chunks. Determinism may be partially provided by identifying non-deterministic events. VM tracing may be transparent to guest software, which need not be instrumented. Alternatively, guests may interface with the virtualization layer to control tracing functionality.

18 Claims, 5 Drawing Sheets

Related U.S. Application Data of application No. 15/488,282, filed on Apr. 14, 2017, now Pat. No. 10,318,332.

(60) Provisional application No. 62/480,408, filed on Apr. 1, 2017.

(56) References Cited

U.S. PATENT DOCUMENTS

| | | |
|---|---|---|
| 8,499,299 B1 | 7/2013 | Jakab et al. |
| 8,578,340 B1 | 11/2013 | Jakab et al. |
| 9,465,680 B1 | 10/2016 | Chynoweth et al. |
| 11,138,092 B2 | 10/2021 | Mola |
| 2003/0037089 A1 | 2/2003 | Cota-robles et al. |
| 2005/0021708 A1 | 1/2005 | Raghuraman et al. |
| 2006/0259823 A1 | 11/2006 | Sohm et al. |
| 2008/0256339 A1 | 10/2008 | Xu et al. |
| 2010/0005464 A1 | 1/2010 | Malyugin et al. |
| 2011/0055515 A1 | 3/2011 | Khubaib et al. |
| 2012/0011491 A1 | 1/2012 | Eldar |
| 2013/0159999 A1* | 6/2013 | Chiueh ............... H04L 41/069 718/1 |
| 2014/0189256 A1 | 7/2014 | Kranich et al. |
| 2022/0012162 A1 | 1/2022 | Mola |
| 2022/0138084 A1 | 5/2022 | Mola |

FOREIGN PATENT DOCUMENTS

| | | |
|---|---|---|
| CN | 1818873 A | 8/2006 |
| CN | 101103337 A | 1/2008 |
| CN | 101403983 A | 4/2009 |
| CN | 101874238 A | 10/2010 |
| CN | 102402458 A | 4/2012 |
| CN | 102844744 A | 12/2012 |
| CN | 103577310 A | 2/2014 |
| CN | 103856480 A | 6/2014 |
| CN | 104461876 A | 3/2015 |
| CN | 104541244 A | 4/2015 |
| CN | 105718374 A | 6/2016 |
| CN | 102597958 A | 2/2017 |
| CN | 106462507 A | 2/2017 |
| CN | 109643273 A | 4/2019 |
| EP | 3526673 A1 | 8/2019 |
| GB | 2365553 A | 2/2002 |

OTHER PUBLICATIONS

"Office Action Issued in Indian Patent Application No. 201947019259", dated Sep. 22, 2021, 7 Pages.
"Summons to Attend Oral Proceedings Issued in European Patent Application No. 17801198.7", Mailed Date: Aug. 4, 2021, 8 Pages.
"Search Report issued in European Patent Application No. 22160576.9", dated May 23, 2022, 10 Pages.
Chen, et al., "Parametric and Sliced Causality", In Proceedings of Internationa! Conference on Computer Aided Verification, Part of the Lecture Notes in Computer Science book Series, vol. 4590, Jul. 3, 2007, pp. 240-253.
"Notice of Allowance Issued in Chinese Patent Application No. 201780069596.2", dated Jul. 14, 2022, 6 Pages.
Long, et al., "A Replay System for Performance Analysis of Multi-Threaded Programs", In Journal of Computer Research and Development, vol. 52, Issue 1, 2015, pp. 45-55.
"First Office Action and Search Report Issued in Chinese Patent Application No. 201780069596.2", dated Jan. 6, 2022, 16 Pages.
Zhou, et al., "RReplay: A Record and Replay System Based on Restricted Multi-threading", In Proceedings of International Conference on Computer Science and Service System, Aug. 11, 2012, pp. 2247-2250.
Quinbo, et al., "Research on Virtual Machine Based Deterministic Execution of Multi-core System", In Thesis Submitted to Graduate School of National University of Defense Technology, Changsha, China, Nov. 2011, 88 Pages.

"Final Office Action Issued in U.S. Appl. No. 16/377,470", dated Mar. 16, 2021, 17 Pages.
"Summons to attend oral proceedings Issued in European Patent Application No. 17768274.7", Mailed Date: Mar. 24, 2022, 10 Pages.
"Notice of Allowance Issued in European Patent Application No. 17801198.7", dated Mar. 17, 2022, 2 Pages.
"Notice of Allowance Issued in European Patent Application No. 18718264.7", dated Mar. 24, 2022, 2 Pages.
"Office Action Issued in Indian Patent Application No. 201947045870", dated Feb. 24, 2022, 6 Pages.
"Office Action Issued in European Patent Application No. 18773284.7", dated Nov. 12, 2021, 12 Pages.
"Office Action Issued in Indian Patent Application No. 201847049857", dated Nov. 18, 2021, 6 Pages.
"Search Report Issued in European Patent Application No. 22158923.7", dated Jul. 6, 2022, 12 Pages.
Chen, et al., "Deterministic Replay: A Survey", in the Journal of ACM Computing Surveys, vol. 48, Issue 2, Sep. 24, 2015, 47 Pages.
"Second Office Action Issued in Chinese Patent Application No. 201780069596.2", dated Apr. 27, 2022, 12 Pages.
"Office Action Issued in European Patent Application No. 17768274.7", dated Feb. 4, 2021, 6 Pages.
"First Office Action and Search Report Issued in Chinese Patent Application No. 201780053059,9", dated Jun. 30, 2021, 14 Pages.
Tenggang, et al., "A Reversible Debugging Method Based on Virtual Machine Logging and Replaying", In Computer Applications and Software, vol. 28, Issue 4, Apr. 30, 2011, pp. 140-142.
"Notice of Allowance Issued in European Patent Application No. 17768274.7", dated Oct. 19, 2022, 8 Pages.
"First Office Action and Search Report Issued in Chinese Patent Application No. 201880021127.8", dated Nov. 10, 2022, 12 Pages.
"Notice of Allowance Issued in European Patent Application No. 17768274.7", dated Feb. 7, 2023, 8 Pages.
"Non-Final Office Action Issued in U.S. Appl. No. 17/473,627", dated Mar. 31, 2023, 31 Pages.
"Notice of Allowance Issued in European Patent Application No. 17768274.7", dated Apr. 28, 2023, 2 Pages.
"Second Office Action Issued in Chinese Patent Application No. 201880021127.8", dated Apr. 13, 2023, 10 Pages.
"First Office Action and Search Report Issued in Chinese Patent Application No. 201880043765.X", dated Mar. 28, 2023, 10 Pages.
U.S. Appl. No. 62/480,408, filed Apr. 1, 2017.
U.S. Appl. No. 16/374,172, filed Apr. 3, 2019.
U.S. Appl. No. 15/488,282, filed Apr. 14, 2017.
U.S. Appl. No. 16/057,353, filed Aug. 7, 2018.
U.S. Appl. No. 15/252,998, filed Aug. 31, 2016.
U.S. Appl. No. 15/349,555, filed Nov. 11, 2016.
U.S. Appl. No. 16/029,372, filed Jul. 6, 2018.
U.S. Appl. No. 17/473,627, filed Sep. 13, 2021.
U.S. Appl. No. 15/253,027, filed Aug. 31, 2016.
U.S. Appl. No. 16/372,705, filed Apr. 2, 2019.
U.S. Appl. No. 15/298,439, filed Oct. 20, 2016.
U.S. Appl. No. 15/637,376, filed Jun. 29, 2017.
U.S. Appl. No. 15/349,474, filed Nov. 11, 2016.
U.S. Appl. No. 15/433,918, filed Feb. 15, 2017.
U.S. Appl. No. 15/604,408, filed May 24, 2017.
U.S. Appl. No. 16/686,564, filed Nov. 18, 2019.
U.S. Appl. No. 17/515,705, filed Nov. 1, 2021.
U.S. Appl. No. 15/604,334, filed May 24, 2017.
U.S. Appl. No. 16/377,470, filed Apr. 8, 2019.
U.S. Appl. No. 14/319,092, filed Jun. 30, 2014.
U.S. Appl. No. 14/751,638, filed Jun. 26, 2015.
U.S. Appl. No. 62/143,435, filed Apr. 6, 2015.
U.S. Appl. No. 15/915,930, filed Mar. 8, 2018.
U.S. Appl. No. 62/559,780, filed Sep. 18, 2017.
U.S. Appl. No. 15/872,453, filed Jan. 16, 2018.
U.S. Appl. No. 15/904,072, filed Feb. 23, 2018.
U.S. Appl. No. 15/898,372, filed Feb. 16, 2018.
U.S. Appl. No. 15/947,699, filed Apr. 6, 2018.
"First Office Action and Search Report Issued in Chinese Patent Application No. 201880043785.X", dated Mar. 28, 2023, 10 Pages.

(56) References Cited

OTHER PUBLICATIONS

"Extended Search Report Issued in European Patent Application No. 23164451.9", dated Jun. 5, 2023, 12 Pages.
"Notice of Allowance issued in Chinese Patent Application No. 201880021127.8", dated Jul. 4, 2023, 9 Pages.
"Notice of Allowance Issued in U.S. Appl. No. 17/463,627", dated Sep. 8, 2023, 16 Pages.
"Notice of Allowance Issued in China Patent Application No. 201880043765.X", dated Aug. 9, 2023, 4 Pages.
Notice of Allowance dated Jan. 10, 2024, in U.S. Appl. No. 17/515,705, 9 pages.

* cited by examiner

VIRTUAL MACHINE EXECUTION TRACING

RELATED APPLICATIONS

This application is a divisional of U.S. patent application Ser. No. 16/374,172, filed Apr. 3, 2019, and entitled "VIRTUAL MACHINE EXECUTION TRACING," which is a divisional of U.S. patent application Ser. No. 15/488,282, filed Apr. 14, 2017, and entitled "VIRTUAL MACHINE EXECUTION TRACING," which claims priority to, and the benefit of, U.S. Provisional Application No. 62/480,408, filed Apr. 1, 2017, and entitled "VIRTUAL MACHINE EXECUTION TRACING." The aforementioned applications are hereby incorporated by reference herein in their entireties.

BACKGROUND

Machine virtualization is a technology for presenting the hardware of a computer as multiple virtual machines (VMs) each able to concurrently execute on the same computer. Each such virtual machine (VM) is able to host a guest operating system and the virtualized presentation of the computer's hardware to a guest operating system is mostly transparent to the guest operating system. Machine virtualization has become efficient, reliable, and convenient to manage. Consequently, machine virtualization is being used more often and for expanding types of applications and workloads.

The growing use of machine virtualization has led to increased demand for understanding the execution of a VM, analyzing performance, maintaining a record of a VM's computing activity, and debugging execution of a VM and/or its guest software. VM execution tracing is one technique that has suggested for these purposes. Execution tracing involves tracing the execution activities of a VM and storing the execution trace for later analysis. An execution trace can be used for detailed post-execution analysis and debugging of VM execution. Ideally, an execution trace is deterministic and "replayable", i.e. it has sufficient information to enable playback features commonly found in software debugging tools such as stepwise execution of statements, reverse playback, detailed stack and symbol analysis before and after each statement, etc.

Although VM execution tracing has been recognized as desirable, previous attempts have had shortcomings in implementation and performance. One approach has been to force a VM to execute in a single thread of execution, which facilitates determinism but is difficult to implement and limits performance. For many types of guest software for which parallelism is critical, this limitation prohibits production use. Another approach has been to capture all of a VMs memory, but this carries startup and storage costs. Yet another approach has been to use complex run-time monitoring of memory states to maintain trace determinism, but this is difficult to implement correctly, has high overhead, and can significantly impact the performance of some workloads. Instrument guest software with trace-enabling instructions is another possibility but this has the practical drawback of requiring recompiling and deploying new executable code. Others have tried to interpose trace logic between a VM and a hypervisor, but with mixed success and many platform specificities.

What is needed are techniques for replayable VM execution tracing that are convenient to implement at the virtualization layer, have a low impact on VM performance, maintain causality for concurrent multiprocessing VMs, and can be used with or without VM visibility or actions.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to a virtualization layer capturing replayable execution traces of VMs managed by the virtualization layer. Execution tracing can be performed on any unit of execution managed by the virtualization layer, e.g., threads, processes, virtual processors, individual VMs, multiple VMs, etc. Traced execution units may be executing in parallel. Execution tracing involves capturing to a buffer (optionally circular): executed instructions, memory inputted to instructions, memory outputted by instructions, registers touched by instructions, and ordering markers. Execution trace data can be captured in chunks, where causality is preserved and ordering is preserved between chunks but not necessarily within chunks. The chunks may be delineated by inserting monotonically increasing markers between context switches, thus relatively ordering the chunks. Determinism may be partially provided by identifying non-deterministic events. VM tracing may be transparent to guest software, which need not be instrumented. Alternatively, guests may interface with the trace-implementing virtualization layer to control tracing functionality.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to tracing execution of virtual machines (VMs) in ways that are efficient, accurately reflect causality. Execution tracing is provided by a trace component within the virtualization layer. The trace component is able to trace parallel VM execution in a way that produces replayable execution traces. A VM may be traced with or without involvement of the guest software within executing within the VM. A trace may be flexibly scoped in terms of when tracing occurs and which VMs or guest software are effectively traced. Several techniques may be used to secure guest data.

Figure 1:
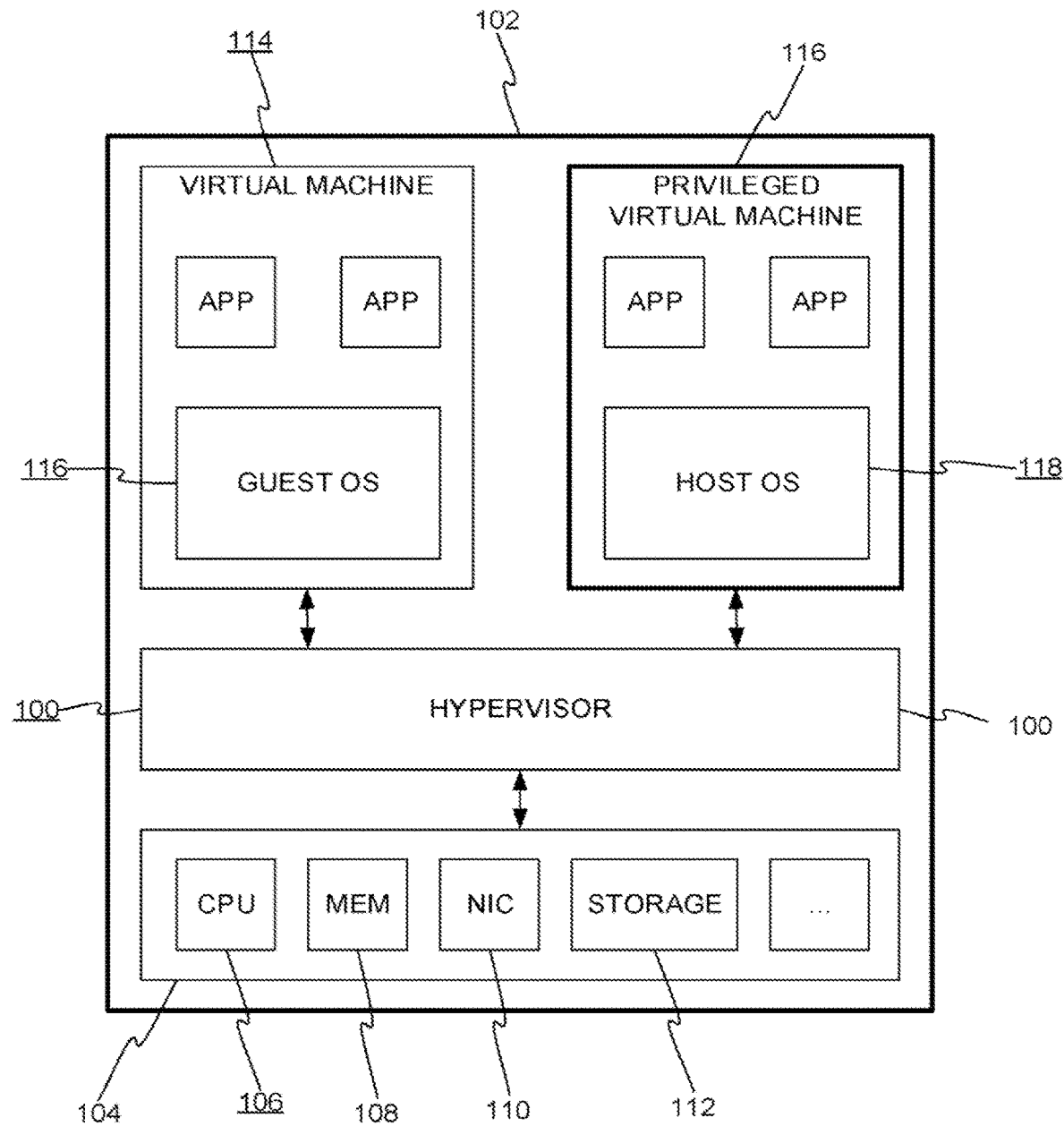
FIG. 1 shows an example virtualization environment that includes a known type of hypervisor.

FIG. 1 shows an example virtualization environment that includes a known type of hypervisor 100. A computer 102 has hardware 104, including a central processing unit (CPU)

106, memory 108, a network interface 110, non-volatile storage 112, and other components not shown, such as a bus, a display and/or display adapter, etc. The hypervisor 100 manages and facilitates execution of virtual machines (VMs) 114, 116. Each virtual machine 114, 116 typically has virtualized devices including a virtual disk within which a guest/host operating system 116, 118 is stored. Machine or system virtualization is provided by the hypervisor 100 cooperating with a host operating system 118 that executes in a privileged VM 116.

The tasks of virtualization may be distributed among the hypervisor 100 and the host operating system 118 in a number of ways. In some cases, the host operating system 118 might consist only of minimal virtualization elements such as tools and user interfaces for managing the hypervisor 100. In other cases, the host operating system 118 might include one or more of: device virtualization management, inter-VM communication facilities, running device drivers, starting or stopping other VMs, tools for interactive VM management, and others. In short, the guest operating system 118 can potentially handle any virtualization tasks outside core functions of a hypervisor such as CPU and memory sharing. As used herein, "virtualization layer" will refer to any combination of hypervisor and guest VM that collectively provide machine virtualization. The term also refers to virtualization systems that do not use a privileged VM to provide virtualization functionality.

Figure 2:
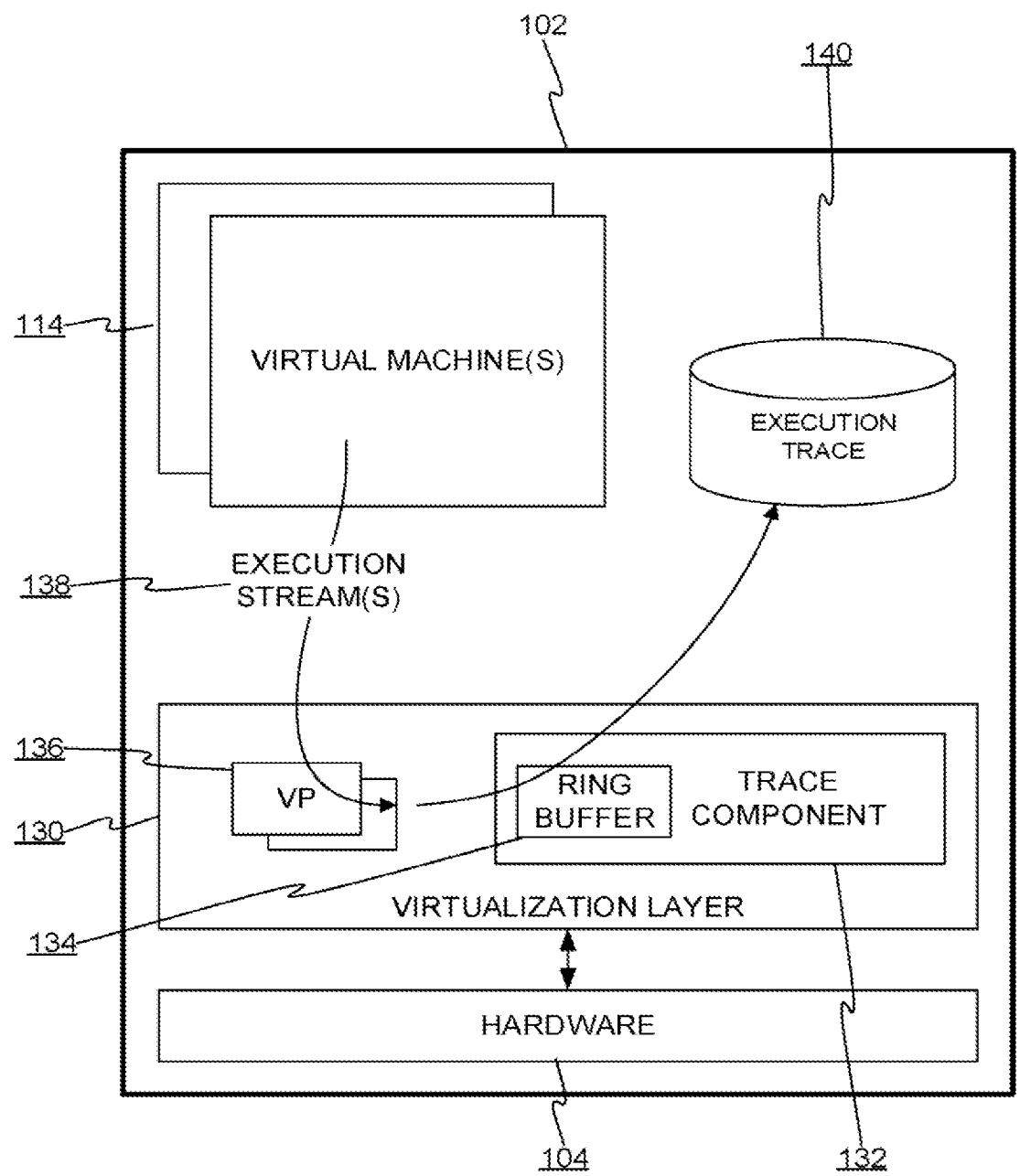
FIG. 2 shows a virtualization layer configured for VM execution tracing.

FIG. 2 shows a virtualization layer 130 configured for VM execution tracing. The virtualization layer 130 includes a trace component 132 and ring buffer 134. Generally, the trace component 132 operates as follows. When a virtual processor 136 of the virtual machine 114 is scheduled for processing time by backing physical processors of the CPU 106, a context switch occurs for the corresponding guest execution unit (e.g., a thread) and processor instructions of that execution (execution stream 138) are processed by the backing physical processor (the term "physical processor" as used herein refers to both physical cores and logical cores in the case of hyperthreaded CPUs). The instructions of the execution stream 138 issued by software in the virtual machine are captured by the trace component 132 as they are received or executed and stored in the ring buffer 134. In one embodiment, instructions are captured using hardware-based trace features of the CPU. In another embodiment, the virtualization layer implements processor emulation and the instruction capturing is built into the processor emulator. In most cases, all instructions are captured when execution tracing is in effect. Execution trace data in the ring buffer 134 may be selective or continuously stored as a persistent execution trace 140 in some local (e.g., a privileged VM's filesystem) or network storage.

Although a ring buffer is convenient and provides certain advantages, other types of buffers may be used. Full tracing likely will not require a circular buffer. As discussed below, buffering can be useful for selective tracing where a particular scope of execution is to be traced (e.g., certain modules, processes, threads, VMs, etc.).

In addition to capturing instructions the execution trace will include data in memory that is touched by the execution of the thread or other execution unit. This involves, instead of copying all memory of the VM 114, copying each piece of memory as it is accessed by the execution being traced; conceptually, the inputs and outputs of the instructions are captured as they are being consumed. (perhaps with compression). Accessed register contents are also captured. Each thread generally consumes its own memory in its own way, and what the other threads do is irrelevant. If a kernel call or another thread modifies the traced thread's memory then those external memory modifications can be captured by the trace component 132. For additional details see U.S. patent application Ser. No. 15/252,998, titled, "PROGRAM TRACING FOR TIME TRAVEL DEBUGGING AND ANALYSIS" (filed Aug. 31, 2016), and Ser. No. 15/253,027, titled "CACHE-BASED TRACING FOR TIME TRAVEL DEBUGGING AND ANALYSIS" (filed Aug. 31, 2016), and both incorporated herein by reference.

In one embodiment, all of the execution of a target VM is traced. Because the virtualization layer 130 knows when the CPU is executing instructions from the target VM, the virtualization layer 130 knows when to perform tracing (when the target VM is executing) and when not to. Thus, the generated trace includes only the activities of the target VM. Even if the target VM has multiple virtual processors (VPs) the virtualization layer 132, which handles CPU scheduling, knows when a VP is executing code for the target VM and traces accordingly. Each thread or execution unit of the target virtual machine is recorded as a separate respective trace set and contains the instructions, memory/registers consumed by same, etc. Post-trace symbol analysis (e.g., during later debugging) can be enabled by recording information that associates each traced instruction with an identifier indicating the executable file or object model or the like that provided the instruction. This allows later reconstruction of symbols from the trace in the same way debuggers provide symbol information.

Most traced execution will have some non-deterministic events that will have to be handled. Non-deterministic instructions are instructions whose output depends on information outside the information that is being tracked for tracing. A first step handling on-deterministic instructions is identifying instructions as such. Once a non-deterministic instruction is detected, the side effects thereof are recorded in the trace and the side effects are reproduced during replay. For example, if an instruction is found to generate a random number, that may be hard to replay with the precision of the original instruction result, so one solution is to record the side effects (in this example, the value of the registry where the random number is located) and at replay time we that number is placed in the appropriate register instead of (or after) executing the original instruction. Another example would be a trace of instruction to read a processor timer. If this is not fully tracked then the side effect can be placed in the trace and at replay time the side effect is used instead of reading the processor timer.

Tracing multiple concurrent threads/VPs presents issues of ordering and causality. If two threads of execution of a traced VM are executing concurrently they can potentially overlap. In order to enable reasoning through causalities in the traces of the respective threads, order of execution is important to consider. While it is possible to include a rich set of trace information to strictly order threads among themselves in a deterministic way, a less burdensome approach is to model trace access to memory in a way that enables sufficient relative ordering for causality without requiring strict ordering relative to all instructions. This can be done by implementing modelling memory for tracing such that reading from memory has acquire semantics and writing to memory has release semantics and ordering and recording those corresponding events. See the aforementioned patent applications for additional details. Because the tracing is done at the virtualization layer the threads/VPs are traced from a common view of causality at the virtualization layer. This same approach can be used not only to order execution of threads of a given VM, but also to order execution of threads of concurrent VMs relative to each other.

Because tracing occurs at the virtualization layer or hypervisor, threads are threads and can be traced regardless of VM execution since memory can be ordered across any two threads. Thus, causality-preserving tracing across machines is possible. This can enable new types of debugging not previously possible. The interactions between software on two different machines (albeit virtual) can be closely correlated.

Figure 3:
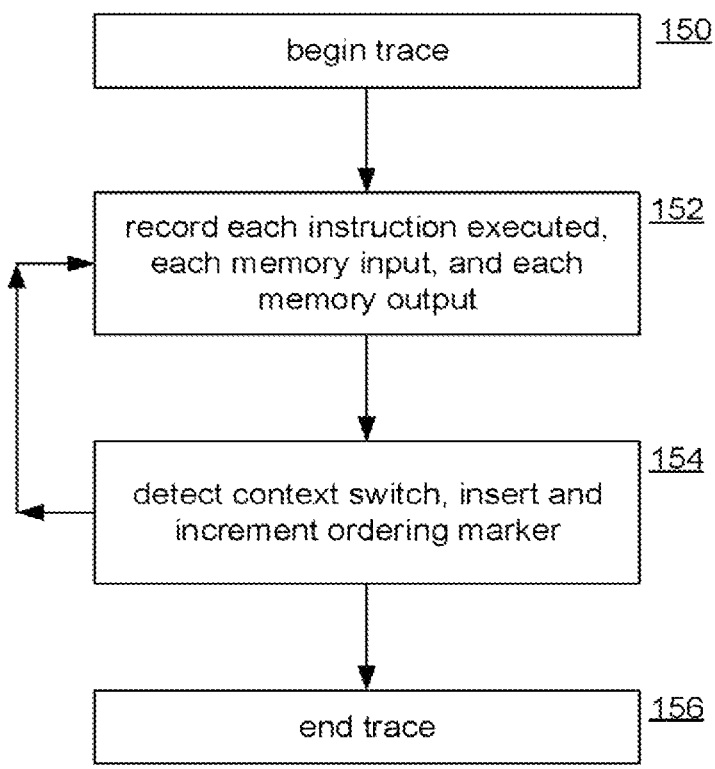
FIG. 3 shows a process for ordering thread traces at the virtualization layer.

FIG. 3 shows a process for ordering thread traces at the virtualization layer. At step 150 tracing begins for whichever VM threads start executing. At step 152 execution tracing is performed as discussed above; thread instructions, memory accesses, registers, etc. are recorded as executed in sets for each respective thread. At step 154 a context switch is detected. Each time a context switch is detected, an ordering marker is inserted into the corresponding thread and an incremented value of the inserted ordering marker is stored and then similarly used the next time an ordering marker is needed. Not that an ordering marker may be inserted into a swapped-in thread, a swapped-out thread, or both. This continues for each thread until it ends at step 156.

Figure 4:
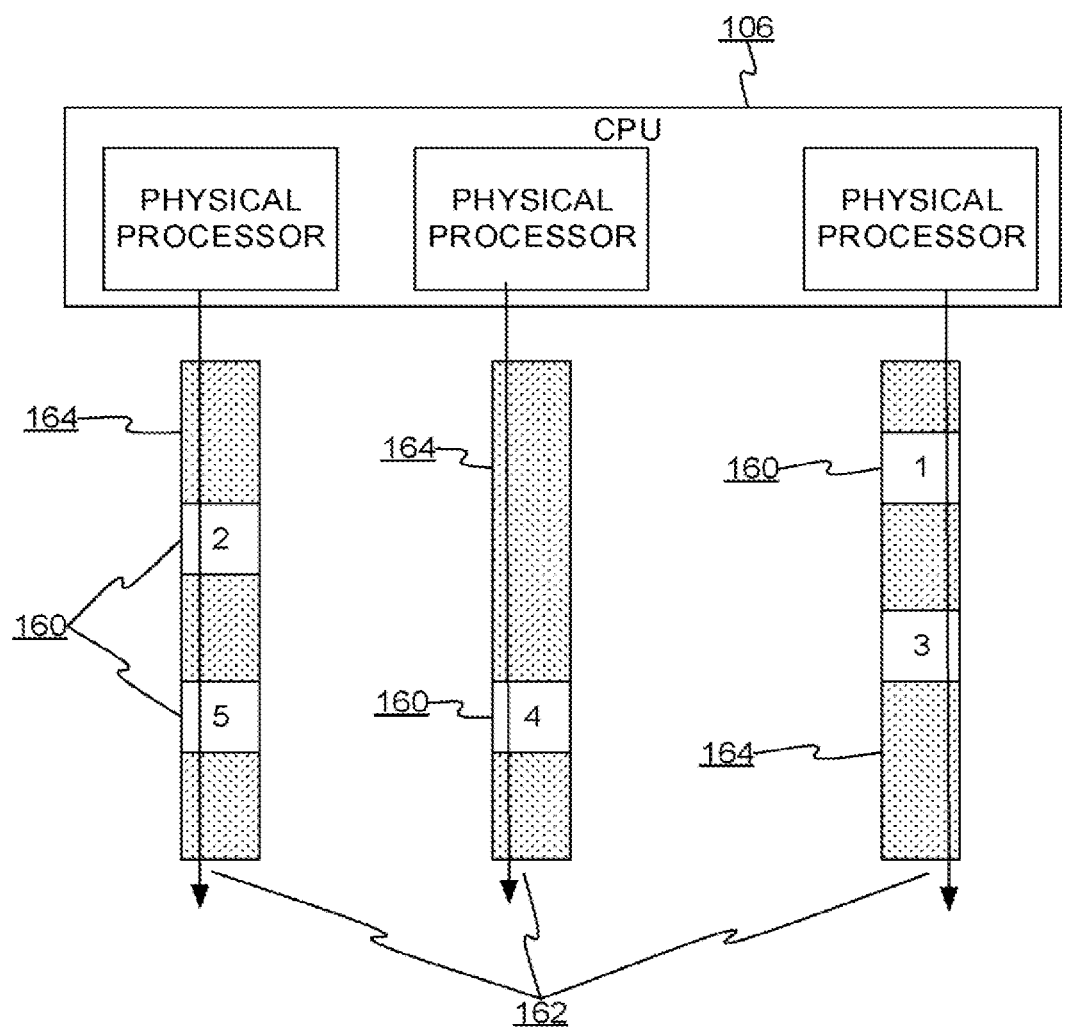
FIG. 4 shows ordering markers inserted into traces of respective threads.

FIG. 4 shows ordering markers 160 inserted into traces 162 of respective threads. Each trace segment 164 (shaded portion) represents a segment of traced instructions and corresponding input/output data that occurs in a same processor context. While strict ordering might not be guaranteed among instructions in a trace segment 164, ordering among the trace segments 164 (with respect to each other) is guaranteed by the ordering markers 160. The context switches represented by the ordering markers 160 may be a switch due to a guest switching threads, CPU scheduling (timeslicing) by the virtualization layer, etc. The ordering markers may be numbers in any monotonically increasing sequence. The markers might be a global value that increments once for each context switch. For some CPUs, the markers might be timestamp counters provided by the CPU (consistent across all CPU cores). Although all instructions of a trace of a VM or a thread might not be fully ordered, partial ordering and causality is assured, including among VMs if multiple VMs are being traced. Note that the degree to which causality is assured may depends on the memory model that is selected and the amount of analysis a user is willing to do on the trace.

Using the trace techniques described above, a variety of trace control functions (described below) may be implemented by the virtualization layer and/or by a privileged VM that provides virtualization functionality as discussed above. The trace control functions control when and/or how tracing is performed or stored. The trace control functions may be implemented by combinations of hypervisor hypercalls, virtualization interfaces exposed by a privileged VM, etc. Although, guests may be instrumented to take advantage of any trace control functions, the trace control functions may instead be invoked by a privileged VM to control tracing for un-instrumented guests. The trace functions described next may be invoked by an instrumented guest or for an un-instrumented by the privileged VM. If the virtualization layer and/or privileged VM provide an interface for invoking trace functions, such interfaces might be in the form of a user interface provided by the privileged VM, through a REST API (Representational State Application Programming Interface), a virtual device driver, a network port, or any other mechanism to communicate with the virtualization layer to control tracing.

Before describing the trace functions, the use of the ring buffer 134 will be explained. The ring buffer is a buffer for storing a forward moving window of execution traces. In some embodiments, the ring buffer may be in continuous use but without persisting the trace data stored in the buffer. The buffer stores trace data in case tracing is invoked during execution of a target VM. The ring buffer is also useful for buffering data that might be needed for capturing trace data. For instance, tracing a non-deterministic event might require access to buffered data that would not otherwise be available at the time of the event. The ring buffer may use keyframes to handle wrapping. For example, a keyframe might be added at every 10% chunk of the buffer so that only 10% of the buffer is lost as each new piece of data is added. The ring buffer is also a useful place for performing compression (see above-referenced patent applications) and/or for performing encryption (discussed below).

One of the trace functions is a simple on/off function for turning tracing on or off. The on/off function may have a variety of parameters. One parameter may be the target to be traced. The target may be one or more identified individual VMs or the calling VM (implicit). The target might be an individual process or set of processes. Another parameter may be time extents of the trace. The time might be defined as a time range, for instance, a duration (including possibly backward in time as permitted by how far back the contents of the ring buffer go).

Another trace function is a periodic trace function. Tracing can be activated for periods of time to sample trace data. For example, tracing might be captured 1 second per minute, 10 minutes once per hour, etc. The ring buffer may be in effect for sufficient encompassing time periods to enable the sampling.

Yet another trace function is event-based tracing. Tracing can be linked to identified events such as hypercalls, interrupts, system events (e.g., a process crash) or the like to automatically trace data at times linked to the identified events. Note that any of the trace functions above can potentially be scoped in the same way as the on/off function. That is, any type of trace control may be scoped to a particular process, VM, particular processes on any VMs, a defined VM set, etc. Event-based tracing and other functions for ad hoc trace recording may require that tracing is being performed in the ring buffer and trace data from the ring buffer is only persisted when needed.

Still another trace function is trace encryption. Because VMs may be in different security domains and cross-VM data leaks would be considered security breaches, it is possible for the virtualization layer to encrypt trace data from memory (i.e., instruction inputs and outputs, as well as registers) before it is stored for later post-processing analysis. If the virtualization layer has a key that is private to a VM, the key can be used to encrypt at least the data of a trace of that VM. A debugger configured with a decryption module can potentially use the key to perform debugging on the encrypted trace data. In one embodiment, encryption is used when a non-instrumented VM is traced at the request of another VM. That is, security measures can be triggered based on the relative security levels of the traced VM and the trace-requesting VM.

It should be noted that the trace techniques described herein do not require that the virtualization layer run directly on hardware. Nested VMs can use the same techniques without modification. In other words, a virtualization layer executing within a VM may itself perform tracing of its VMs. If CPU hardware tracing is to be used, the CPU trace features may be used whenever the nested virtualization layer has a slice of CPU time.

Figure 5:
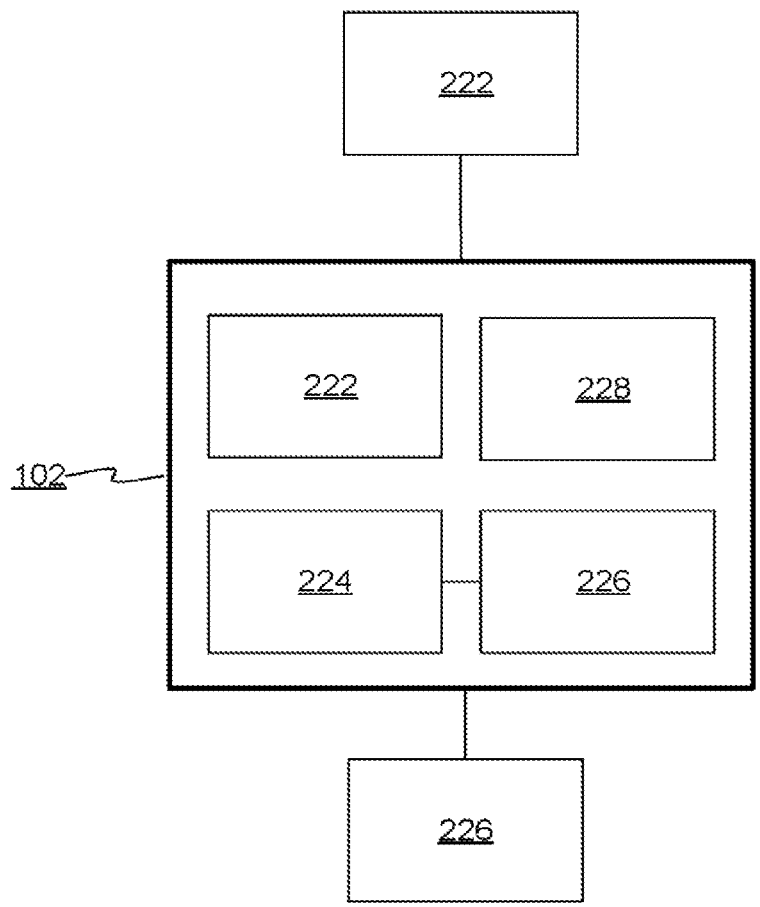
FIG. 5 shows details of the computing device on which embodiments described above may be implemented.

FIG. 5 shows details of the computing device 102 on which embodiments described above may be implemented. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 220 to implement any of the features or embodiments described herein.

The computing device 102 may have one or more displays 222, a network interface 224 (or several), as well as storage hardware 226 and processing hardware 228, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 226 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 102 may cooperate in ways well understood in the art of machine computing. In addition, input devices may be integrated with or in communication with the computing device 102. The computing device 102 may have any form-factor or may be used in any type of encompassing device. The computing device 102 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 228. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

What is claimed:

1. A computing device comprising:
    processing hardware; and
    storage hardware that stores:
        a virtualization layer comprising a hypervisor;
        a first virtual machine comprising a first guest operating system, the first guest operating system comprising a first guest kernel, the first virtual machine further comprising a first set of virtual processors managed by the virtualization layer, the first guest kernel configured to issue guest processor instructions to the first set of virtual processors; and
        a second virtual machine comprising a second guest operating system, the second guest operating system comprising a second guest kernel, the second virtual machine further comprising a second set of virtual processors managed by the virtualization layer, the second guest kernel configured to issue guest processor instructions to the second set of virtual processors,
    the virtualization layer configured to, when the computing device is operating, concurrently execute the first set of virtual processors and the second set of virtual processors on the virtualization layer, the virtualization layer further configured to, when the computing device is operating:
        capture, into a first trace file, first indicia of whichever first guest processor instructions are issued by the first guest kernel to the first set of virtual processors, the first trace file comprising a first set of instruction indicia and a first set of ordering markers, the first set of instruction indicia comprising chunks, wherein the chunks within the first set of instruction indicia preserve causality with respect to each other, and
        concurrent with capturing the first trace file, capture, into a second trace file, second indicia of whichever second guest processor instructions are issued by the second guest kernel to the second set of virtual processors, the second trace file comprising a second set of instruction indicia and a second set of ordering markers, the second set of instruction indicia comprising chunks, wherein the chunks within the second set of instruction indicia preserve causality with respect to each other,
    wherein the first set of ordering markers and the second set of ordering markers enable a determination of causality between a first processor instruction in the first set of instruction indicia and a second processor instruction in the second set of instruction indicia.

2. A computing device according to claim 1, wherein the virtualization layer is further configured to:
    detect a first context switch of the first set of virtual processors, and insert a first ordering marker the first set of ordering markers into the first trace file; and
    detect a second context switch of the second set of virtual processors, and insert a second ordering marker of the second set of ordering markers into the second trace file.

3. A computing device according to claim 2, wherein,
    ordering markers are inserted in a chronological order corresponding to respective context switches; and
    each newly inserted ordering marker comprises a value larger than a previously inserted ordering marker.

4. A computing device according to claim 1, wherein the virtualization layer is further configured to:
    identify a first executable file associated with the first set of virtual processors, and store a first indication of the first executable file in association with the first trace file; and
    identify a second executable file associated with the second set of virtual processors, and store a second indication of the second executable file in association with the second trace file.

5. A computing device according to claim 1, wherein the storage hardware also stores instructions configured to, when executed by the processing hardware, cause the computing device to display a user interface, the user interface comprising a user interface element to enable execution tracing to be turned on/off.

6. A computing device according to claim 5, wherein the user interface enables a user to specify any arbitrary virtual machine managed by the virtualization layer to have execution tracing turned on/off.

7. A method performed by a computing device comprising,
   processing hardware, and
   storage hardware storing,
   (i) a virtualization layer comprising a hypervisor,
   (ii) a first virtual machine comprising a first guest operating system, the first guest operating system comprising a first guest kernel, the first virtual machine further comprising a first set of virtual processors managed by the virtualization layer, the first guest kernel configured to issue guest processor instructions to the first set of virtual processors, and
   (ii) a second virtual machine comprising a second guest operating system, the second guest operating system comprising a second guest kernel, the second virtual machine further comprising a second set of virtual processors managed by the virtualization layer, the second guest kernel configured to issue guest processor instructions to the second set of virtual processors,
   the method comprising, when the computing device is operating:
   concurrently executing the first set of virtual processors and the second set of virtual processors on the virtualization layer;
   capturing, into a first trace file, first indicia of whichever first guest instructions are issued by the first guest kernel to the first set of virtual processors, the first trace file comprising a first set of instruction indicia and a first set of ordering markers, the first set of instruction indicia comprising chunks, wherein the chunks within the first set of instruction indicia preserve causality with respect to each other;
   concurrent with capturing the first trace file, capturing, into a second trace file, second indicia of whichever second guest instructions are issued by the second guest kernel to the second set of virtual processors, the second trace file comprising a second set of instruction indicia and a second set of ordering markers, the second set of instruction indicia comprising chunks, wherein the chunks within the second set of instruction indicia preserve causality with respect to each other,
   wherein the first set of ordering markers and the second set of ordering markers enable a determination of causality between a first processor instruction in the first set of instruction indicia and a second processor instruction in the second set of instruction indicia.

8. A method according to claim 7, further comprising:
   detecting a first context switch of the first set of virtual processors, and insert a first ordering marker the first set of ordering markers into the first trace file; and
   detecting a second context switch of the second set of virtual processors, and insert a second ordering marker of the second set of ordering markers into the second trace file.

9. A method according to claim 8, wherein
   ordering markers are inserted in a chronological order corresponding to respective context switches; and each newly inserted ordering marker comprises a value larger than a previously inserted ordering marker.

10. A method according to claim 7, further comprising:
    identifying a first executable file associated with the first set of virtual processors, and store a first indication of the first executable file in association with the first trace file; and
    identifying a second executable file associated with the second set of virtual processors, and store a second indication of the second executable file in association with the second trace file.

11. A method according to claim 7, further comprising displaying a user interface, the user interface comprising a user interface element to enable execution tracing to be turned on/off.

12. A method according to claim 11, wherein the user interface enables a user to specify any arbitrary virtual machine managed by the virtualization layer to have execution tracing turned on/off.

13. Storage hardware that stores:
    (i) a virtualization layer comprising a hypervisor,
    (ii) a first virtual machine comprising a first guest operating system, the first guest operating system comprising a first guest kernel, the first virtual machine further comprising a first set of virtual processors managed by the virtualization layer, the first guest kernel configured to issue guest processor instructions to the first set of virtual processors,
    (iii) a second virtual machine comprising a second guest operating system, the second guest operating system comprising a second guest kernel, the second virtual machine further comprising a second set of virtual processors managed by the virtualization layer, the second guest kernel configured to issue guest processor instructions to the second set of virtual processors, and
    (iv) instructions configured to, when executed by processing hardware, cause a computing device to:
    concurrently execute the first set of virtual processors and the second set of virtual processors on the virtualization layer;
    capture, into a first trace file, first indicia of whichever first guest instructions are issued by the first guest kernel to the first set of virtual processors, the first trace file comprising a first set of instruction indicia and a first set of ordering markers, the first set of instruction indicia comprising chunks, wherein the chunks within the first set of instruction indicia preserve causality with respect to each other;
    concurrent with capturing the first trace file, capture, into a second trace file, second indicia of whichever second guest instructions are issued by the second guest kernel to the second set of virtual processors, the second trace file comprising a second set of instruction indicia and a second set of ordering markers, the second set of instruction indicia comprising chunks, wherein the chunks within the second set of instruction indicia preserve causality with respect to each other,
    wherein the first set of ordering markers and the second set of ordering markers enable a determination of causality between a first processor instruction in the first set of instruction indicia and a second processor instruction in the second set of instruction indicia.

14. A storage hardware according to claim 13, wherein the virtualization layer is configured to:

detect a first context switch of the first set of virtual processors, and insert a first ordering marker the first set of ordering markers into the first trace file; and detect a second context switch of the second set of virtual processors, and insert a second ordering marker of the second set of ordering markers into the second trace file.

15. A storage hardware according to claim 14, wherein, ordering markers are inserted in a chronological order corresponding to lithell respective context switches; and each newly inserted ordering marker comprises a value larger than a previously inserted ordering marker.

16. A storage hardware according to claim 13, wherein the virtualization layer is configured to:

identify a first executable file associated with the first set of virtual processors, and store a first indication of the first executable file in association with the first trace file; and identify a second executable file associated with the second set of virtual processors, and store a second indication of the second executable file in association with the second trace file.

17. A storage hardware according to claim 13, wherein the storage hardware also stores instructions configured to, when executed by the processing hardware, cause the computing device to display a user interface, the user interface comprising a user interface element to enable execution tracing to be turned on/off.

18. A storage hardware according to claim 17, wherein the user interface enables a user to specify any arbitrary virtual machine managed by the virtualization layer to have execution tracing turned on/off.

\* \* \* \* \*